United States Patent
Scholten et al.

(10) Patent No.: US 6,948,580 B2
(45) Date of Patent: Sep. 27, 2005

(54) HYDRAULIC TILTING DEVICE FOR TILTING A VEHICLE CAB

(75) Inventors: René Hendrikus Plechelmus Scholten, Rossum (NL); Roeland Mallan, Enschede (NL)

(73) Assignee: Actuant Corporation, Glendale, WI (US)

(*) Notice: Subject to any disclaimer, the term of this patent is extended or adjusted under 35 U.S.C. 154(b) by 240 days.

(21) Appl. No.: 10/398,093

(22) PCT Filed: Oct. 1, 2001

(86) PCT No.: PCT/NL01/00718

§ 371 (c)(1),
(2), (4) Date: Apr. 2, 2003

(87) PCT Pub. No.: WO02/28697

PCT Pub. Date: Apr. 11, 2002

(65) Prior Publication Data

US 2004/0040763 A1 Mar. 4, 2004

(30) Foreign Application Priority Data

Oct. 3, 2000 (NL) ............................................. 1016315

(51) Int. Cl.[7] ............................................. B62D 33/08
(52) U.S. Cl. ........................... 180/89.14; 280/124.157; 280/124.161; 296/190.06; 296/190.07
(58) Field of Search ........................... 180/89.12, 89.13, 180/89.14, 89.15, 89.16, 89.17; 280/124.157, 124.16, 124.161, 6.159; 296/190.06, 190.07

(56) References Cited

U.S. PATENT DOCUMENTS

| | | | | |
|---|---|---|---|---|
| 3,985,194 A | * | 10/1976 | Knutson | 180/89.15 |
| 4,410,056 A | * | 10/1983 | Pound et al. | 180/89.15 |
| 4,442,912 A | * | 4/1984 | Vette | 180/89.15 |
| 4,446,939 A | * | 5/1984 | Oudelaar | 180/89.15 |
| 4,463,818 A | * | 8/1984 | Sonneborn | 180/89.15 |
| 4,483,409 A | * | 11/1984 | Fun | 180/89.15 |
| 4,493,386 A | * | 1/1985 | Sonneborn | 180/89.15 |
| 5,839,278 A | * | 11/1998 | Sonneborn | 60/403 |
| 6,068,074 A | * | 5/2000 | Sonneborn et al. | 180/89.14 |

FOREIGN PATENT DOCUMENTS

| | | |
|---|---|---|
| DE | 197 30 499 | 1/1999 |
| DE | 199 05 512 | 7/2000 |
| EP | 0 586 968 | 3/1994 |
| EP | 0736443 A1 * | 10/1996 |
| GB | 2 079 378 | 1/1982 |
| WO | 00/00378 | 1/2000 |

OTHER PUBLICATIONS

International Search Report, Form PCT/ISA/210, as issued by European Patent Office in Connection with PCT Application No. PCT/NL01/00718.

English Language Translation of Search Report issued in Connection with Application No. NL1016315.

* cited by examiner

*Primary Examiner*—Paul N. Dickson
*Assistant Examiner*—Toan C To
(74) *Attorney, Agent, or Firm*—Quarles & Brady LLP

(57) ABSTRACT

A hydraulic tilting device for tilting a cab mounted on the chassis of a vehicle between a driving and a tilted position comprises a reservoir for hydraulic fluid, a pump connected to the reservoir, and a double-acting hydraulic tilting cylinder. A lost-motion conduit is provided between ports opening into a push chamber and a pull chamber in the cylinder space of the tilting cylinder when the piston/piston rod assembly is in a lost-motion range defined by the ports. When under the influence of the movements of the piston/piston rod assembly within the lost-motion range, the pull connection of the tilting cylinder causes suction of hydraulic fluid out of the reservoir, forcing hydraulic fluid from the reservoir into the pull chamber, and moving hydraulic fluid from the pull chamber to the reservoir through the lost-motion conduit. Hydraulic fluid therefore circulates when the cab is carrying out spring movements.

11 Claims, 3 Drawing Sheets

HYDRAULIC TILTING DEVICE FOR TILTING A VEHICLE CAB

FIELD OF THE INVENTION

The present invention relates to a hydraulic tilting device for tilting a cab of a vehicle between a driving position and a tilted position.

BACKGROUND OF THE INVENTION

It is generally known from the prior art to connect a cab of a vehicle in a tiltable manner to the chassis of the vehicle, so that the cab can be tilted between a driving position, in which the vehicle can be driven, and a tilted position, in which, for example, maintenance can be carried out on the engine situated below the cab. It is further generally known for such a tilting cab in the driving position to be resiliently supported on the chassis in order to provide greater comfort for those in the cab, in particular the driver, while the vehicle is being driven.

For tilting such a resiliently mounted cab, it is known to use a hydraulic tilting device with a tilting cylinder disposed between the chassis and the tilting cab. In order to ensure that while the vehicle is being driven the tilting cylinder does not interfere with the spring movements of the cab relative to the chassis, tilting devices with a so-called lost-motion mode are used. These tilting devices can be divided largely into two types, on the one hand, a mechanical type with, for example, a lost-motion arm, which is usually pivotably connected between the tilting cylinder and the cab, or with a sort of pin-and-groove connection between the tilting cylinder and the cab, and, on the other hand, a hydraulic type.

In the case of a tilting device with a hydraulic lost-motion, the tilting cylinder exhibits a lost-motion effect. A hydraulic cab tilting device of this type is known, for example from GB 2 079 378.

It is proposed in this publication that when the vehicle is being driven and the cab is carrying out spring movements, the piston/piston-rod assembly can move up and down unimpeded, since the piston is in a lost-motion range that is defined by the two ports of the lost-motion conduit. In this case the pump of the tilting device is out of action in this lost-motion mode.

In the case of this known tilting device anti-suction valves are provided in the fluid line system in such a way that in the lost-motion mode said valves ensure that fluid cannot be sucked out of the reservoir and cannot enter the cylinder space of the tilting cylinder. The result that is intended to be achieved with this in the case of the known tilting device is that the movement up and down of the piston/piston rod assembly in the lost-motion mode should lead to the displacement of a certain quantity of hydraulic fluid out of the tilting cylinder. The object of this is to create a vacuum in the cylinder space of the tilting cylinder, since the suction of fluid out of the reservoir is blocked. The object of the vacuum is to impede the movement up and down of the piston/piston rod assembly as little as possible in the lost-motion mode, so that the spring movement of the cab directly connected to the piston/piston rod assembly is not disrupted.

It appears from experiments that the tilting device proposed in GB 2 079 378 does not function as expected. In particular, it appears that the functioning of the lost-motion mode in the manner described in GB 2 079 378 cannot be guaranteed during the envisaged service life of such a tilting device. It is pointed out that during that service life the piston/piston rod assembly will move up and down many millions of times in the lost-motion mode.

It is in fact found that the known tilting device is susceptible to two phenomena.

The first phenomenon is that, taking into account the envisaged service life, there is a great chance that at a certain point in time the sealing effect of the piston rod seal will be inadequate, so that air will be able to enter the cylinder space. In this case the vacuum that prevails during the lost-motion mode has an adverse effect on that sealing effect.

The second phenomenon is that the valve in the lost-motion conduit is set to open at a certain hydraulic pressure and otherwise to seal off that lost-motion conduit. Again taking into account the envisaged service life, the functioning of this valve will also deviate from the envisaged functioning after some time, for example owing to almost unavoidable wear. In particular, there is a considerable chance of the valve at some point opening at a pressure that is lower than that intended.

As a result of these phenomena, it can happen that air is sucked in along the piston rod seal. Such air, once sucked in, remains in the hydraulic system of the tilting device. The air sucked in causes an excessively large quantity of fluid to be forced out of the tilting cylinder to the reservoir, by way of the lost-motion conduit and the push chamber, with the result that the pressure in said reservoir increases and the reservoir may overflow. The quantity of fluid forced out is particularly great if the opening pressure of the valve in the lost-motion conduit is lower than was originally envisaged, which can be the consequence of the almost unavoidable wear of that valve.

The air sucked in does not interfere greatly with the lost-motion effect of the tilting cylinder, but constitutes a problem in particular when the cab is subsequently being tilted by means of the tilting device. It can then, in fact, happen that the cab tips forward abruptly with an enormous bang as soon as the centre of gravity of the cab passes the pivot point relative to the chassis. The cause of that undesirable and potentially dangerous movement of the cab is the air present in the pull chamber of the tilting cylinder.

Another risk is that so much air is sucked in that hydraulic fluid flows out of the reservoir and a shortage of fluid arises. That shortage can be such that the tilting of the cab cannot be carried out properly or at all. There is also a considerable chance then of the shortage of hydraulic fluid being made up, but of the tilting device, in particular the pull chamber, being inadequately vented. The problem mentioned earlier can occur again as a result of this.

OBJECT OF THE INVENTION

The present invention aims to provide a reliably functioning cab tilting device with a hydraulic lost-motion effect.

SUMMARY OF THE INVENTION

The present invention achieves this object by providing a tilting device, which is characterized in that the tilting device is designed in such a way that during the movements up and down of the piston of the piston/piston rod assembly within the lost-motion range hydraulic fluid is supplied from the reservoir to the pull chamber by way of the pull connection, and in that hydraulic fluid is moved from the pull chamber to the reservoir by way of the lost-motion conduit, possibly by way of the push chamber, so that a circulation of hydraulic fluid occurs in its entirety if the cab is carrying out spring movements.

The tilting device according to the invention is based on the following insight. The supply of hydraulic fluid occurring time and again from the reservoir to the pull chamber is caused by suction from the pull chamber and/or propulsion from the reservoir. This now desirable supply of fluid ensures that the pressure in the pull chamber can constantly recover. It is pointed out here that the reservoir, which is an airtight construction, acts as an accumulator, in which fluid is stored first—which is accompanied by an increase in pressure—and fluid is then released again to the pull chamber. In order to achieve the effect described above, only a slight fluid volume need be circulated in each case. It is even considered advantageous for the circulated volume to be as small as possible, because when large fluid volumes are circulated the flow resistances in the hydraulic system interfere with the envisaged circulation effect. The correct circulation can be obtained by synchronizing the opening pressures of the valves in the system and the resistances formed by the various throttling devices and the lines.

Advantageous embodiments of the tilting device according to the invention will be described below with reference to the drawing.

DETAILED DESCRIPTION OF EXEMPLARY EMBODIMENTS

Figure 1:
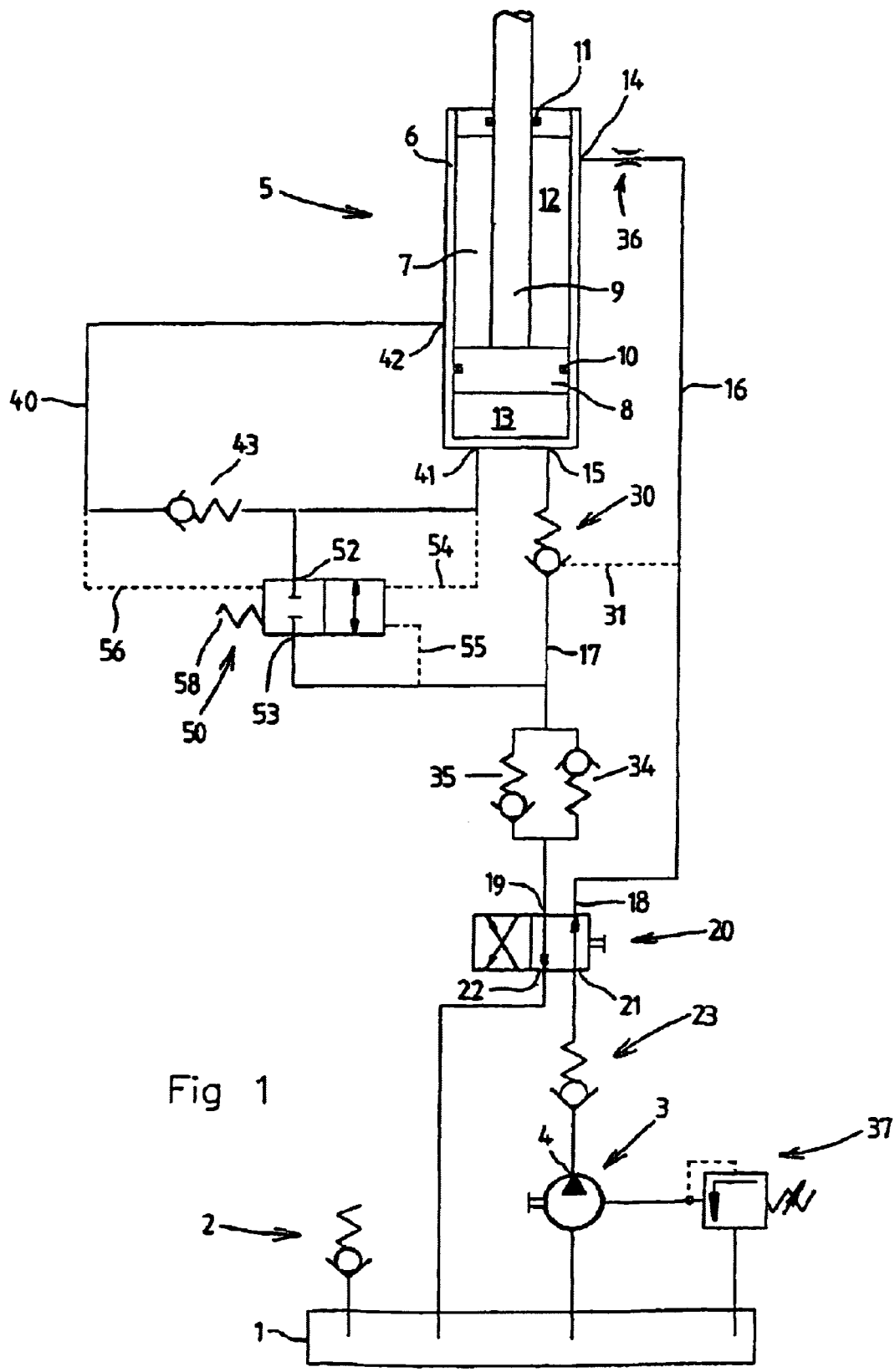
FIG. 1 shows the hydraulic diagram of an exemplary embodiment of the tilting device according to the invention.
Figure 2:
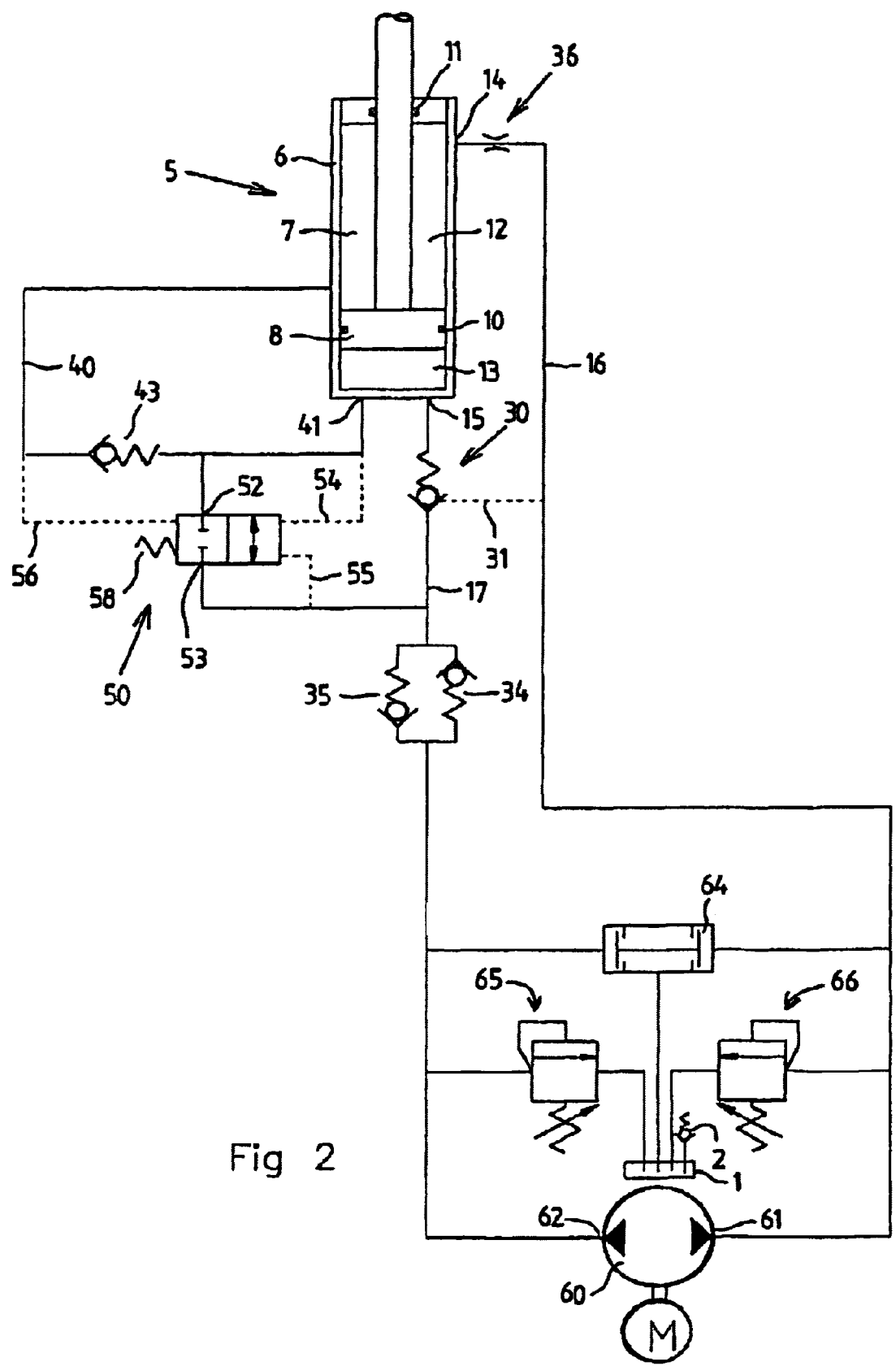
FIG. 2 shows the hydraulic diagram of another exemplary embodiment of the tilting device according to the invention.
Figure 3:
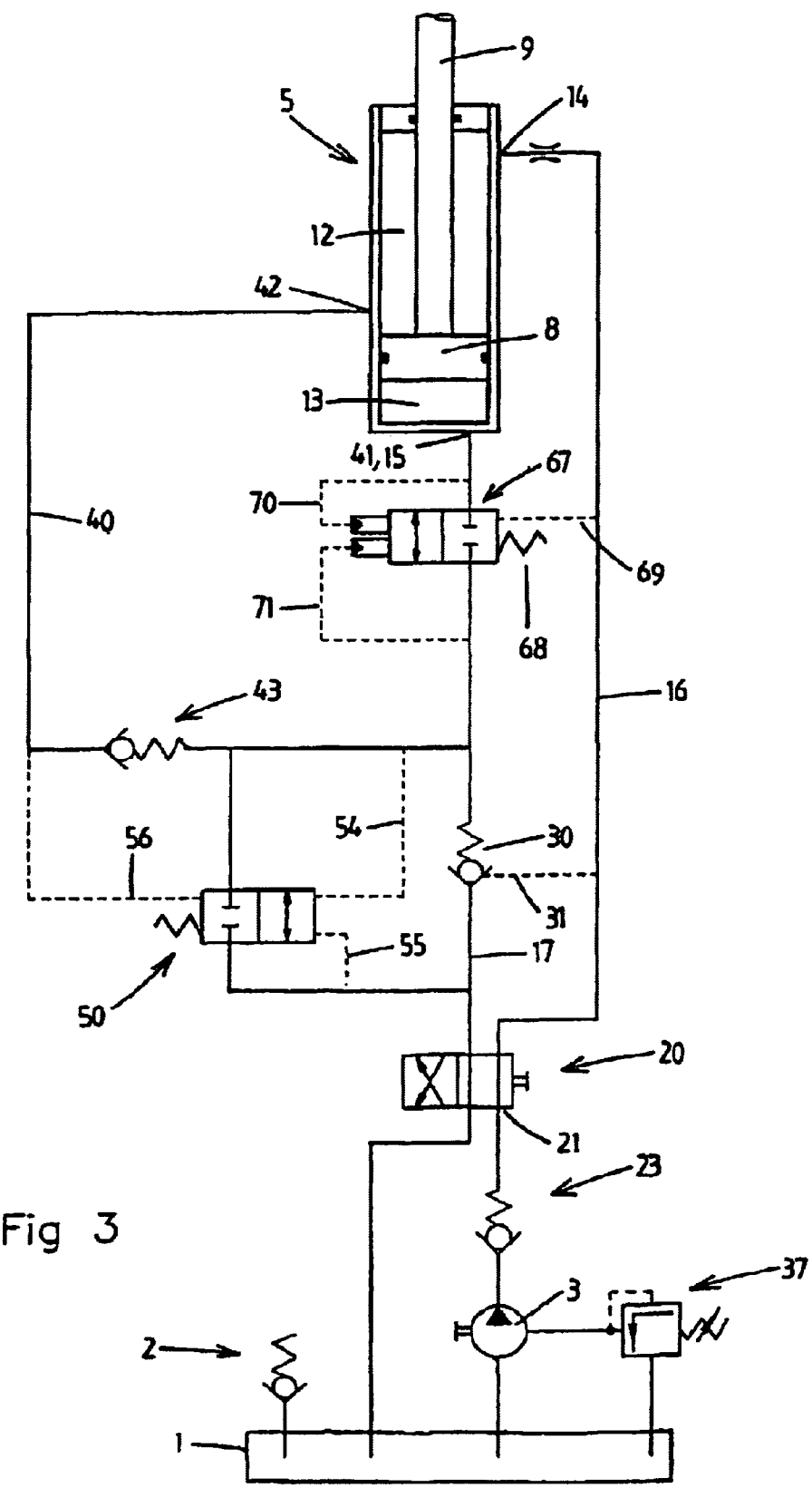
FIG. 3 shows the hydraulic diagram of another exemplary embodiment of the tilting device according to the invention.

The hydraulic tilting devices according to the invention shown in FIGS. 1, 2 and 3 are intended for tilting the driver's cab of a vehicle, in particular of a lorry. Such cabs are usually fitted on the chassis of the vehicle and are connected to the chassis so that they can tilt by way of pivoting means. The pivoting means are designed in such a way that the cab can tilt between a driving position, in which the vehicle can be driven, and a tilted position, generally forward, in which, for example, maintenance can be carried out on the vehicle, in particular on the engine of the vehicle, which is fully or partially situated below the cab.

Such vehicles are also usually provided with resilient cab supporting means, which support the cab in the driving position, in such a way that in the driving position the cab can spring up and down relative to the chassis, thus increasing the comfort of the driver. The hydraulic tilting device is provided for tilting the cab forward and back again.

The tilting device comprises an airtight reservoir 1 for hydraulic fluid, the inside of the reservoir being sealed off from the outside air. A pressure-limiting valve 2 limits the pressure in the reservoir 1 to a predetermined pressure value above atmospheric pressure, for example to a pressure of 1.5 bar above the outside air pressure.

The tilting device of FIG. 1 further comprises a pump 3, which is connected to the reservoir 1, and in this case is of the type with a single delivery port 4 for delivering fluid under pressure, for example a hand pump.

FIGS. 1, 2 and 3 further show a double-acting, linear hydraulic tilting cylinder 5, for tilting the driver's cab (not shown). The cylinder 5 comprises a cylinder housing 6, containing a cylinder space 7, in which a piston/piston rod assembly can move up and down. The piston/piston rod assembly comprises a piston 8 and a piston rod 9 immovably connected to it. Around the piston B lies a sealing ring 10, while the piston rod 9 projects outwards out of the cylinder housing 6 through a piston rod seal 11. The cylinder 5 is normally disposed between the cab and the chassis of the vehicle, the cylinder housing 6 generally being connected in a swivellable manner to the chassis, and the end of the piston rod 9 generally being connected in a swivellable manner to the cab.

The piston/piston rod assembly 8, 9 forms a pull chamber 12 in the cylinder space 7, which pull chamber retracts the piston/piston rod assembly when hydraulic fluid is supplied to it, and a push chamber 13, which extends the piston/piston rod assembly when hydraulic fluid is supplied to it. A corresponding pull connection 14 and push connection 15 are provided for the pull chamber 12 and the push chamber 13 respectively.

A first hydraulic line 16 connects to the pull connection 14, and a second hydraulic line 17 connects to the push connection 15. The lines 16, 17 are connected at the other end to a corresponding port 18, 19 of a two-position control valve 20. Said control valve has two further ports 21, 22, which are in communication with the delivery port 4 of the pump 3 and with the reservoir 1 respectively.

A non-return valve 23, which closes in the direction of the pump 3, is accommodated in the connection with the delivery port 4.

In the second line 17 a hydraulically operated non-return valve 30 is accommodated near the push connection 15, which non-return valve closes in the direction of the valve 20 and opens if sufficient hydraulic pressure is present in the control line 31 connected to the line 16.

A suction-blocking device is accommodated in the second line 17, between the non-return valve 30 and the control valve 20, which suction-blocking device prevents unimpeded suction of fluid through the line 17. That device could be composed of two non-return valves 34, 35 positioned parallel to each other and working in opposite directions, as shown diagrammatically in the figures. However, in practice, provision can be made for an O-ring to be fitted in a bore, and for a ball which at a certain pressure is forced through the O-ring. When the ball has then gone past the O-ring, the passage is clear. The rigidity of the O-ring in combination with the dimensions of the O-ring and the ball are largely the determining factors for the pressure at which the ball passes through the O-ring, in practice, for example 7 bar at room temperature.

In this embodiment no further valves in addition to the valves 20 and 23 (integral with the pump) are present between the pull chamber 12 and the pump 3. A throttling device 36 is provided near the pull connection 14 in the line 16.

A pressure-relief valve 37, placed between the first line 16 and the reservoir 1, is provided in order to prevent an excessively high pressure of the fluid in the hydraulic circuit.

The tilting device also comprises a lost-motion conduit 40 with two ports opening into the cylinder space 7, indicated by 41 and 42 respectively, it being possible for the port 41 to coincide with the push connection 15 of the cylinder 5.

The lost-motion conduit 40 is shown diagrammatically and can be designed in various ways. For instance, it is possible for the lost-motion conduit 40 to be formed by a lost-motion line lying along the outside of the cylinder housing 6. However, it is also conceivable for the lost-motion conduit to be provided in the cylinder housing 6. In yet another variant the lost-motion conduit 40 is provided in a tube extending upwards from the bottom of the cylinder housing 6 in the cylinder space.

The lost-motion conduit 40 connects the pull chamber 12 to the push chamber 13 when the piston 8 is situated between the two ports 41, 42 of the conduit 40, which is the case in a position of the piston/piston rod assembly associated with the driving position of the cab. When the vehicle is being driven the pump 3 is out of action and the tilting device is operating in its lost-motion mode.

A non-return valve 43 is accommodated in the lost-motion conduit 40, which non-return valve closes in the direction of the port 42, which port 42 in the lost-motion mode of the tilting device opens into the pull chamber 12.

The hydraulic tilting device illustrated further comprises a hydraulically operated slide valve 50 of the two-way/two-position 2/2 type with spring return. The valve 50 has a first valve port 52, which is connected to the push chamber 13 of the cylinder 5, and a second valve port 53, which is connected to the line 17 between the valve set 34, 35 and the non-return valve 30.

The valve 50 has a sliding element which is slidable in the valve housing and is hydraulically adjustable to the open position under the influence of hydraulic pressure by way of the control line 54 and the control line 55. The control line 54 is directly connected to the push chamber 13, and the control line 55 is connected to the line 17 between the valve set 34, 35 and the non-return valve 30.

By way of control line 56, which is in direct communication with the port 42, a hydraulic pressure can be exerted upon the sliding element, forcing the sliding element to the closed position.

If the process is stopped during forward tilting of the cab, and the cab is going to fall back to the driving position again under its own weight, then the non-return valve 30 closes. If the piston 8 is situated above the port 42 at the time of stopping, the valve 50 also remains closed, because the hydraulic pressure in the push chamber 12 then acts upon the sliding element by way of the control line 56. In this way the piston/piston rod assembly is held reliably in place, which is of great importance for the safety of the persons who at the time are moving to or are already in a position below the cab.

When the cab has to be tilted out of the tilted position to the driving position, i.e. the piston rod 9 has to be retracted, fluid is supplied by way of delivery port 4 to the pull chamber 12. The pressure in the first line 16 causes the non-return valve 30 to open, and fluid can flow out of the push chamber 13. If the tilting back is interrupted in a position in which the piston 8 is situated above the port 42, the valve 50 is held in the closed position. The valve 30 also closes, so that the cab then remains at a standstill. If during the tilting back of the cab to the driving position the piston 8 has already passed the port 42, then the pressure falls away in the part of the lost-motion conduit 40 between the valve 43 and port 42. This causes the pressure in the line 56 also to fall away, and the valve 50 is opened through the pressure prevailing in line 54. The result is that the fluid can flow out of the push chamber 13 to the reservoir 1, and the cab can tip back further unimpeded to the driving position, an orifice also being provided in order to limit the speed of movement of the cab. This "free-fall movement" of the cab is desirable in many cases, in order to make the cab lock with one or more cab locking devices, which are fitted on the chassis and secure the cab in the driving position. A relatively rapid tilting movement of the cab is often advantageous for producing the engagement between the cab and such locking devices.

When the cab is in the driving position and the tilting device is brought into the lost-motion mode, which here simply means that the pump 3 is switched off and the valve 20 is in its illustrated position, then the device shown in FIG. 1 works as follows.

When the cab makes such a spring movement that the piston rod 9 is drawn out of the cylinder housing 6, fluid flows out of the pull chamber 12 by way of the port 42, and then passes by way of the line 40, through the opening non-return valve 43, into the push chamber 13. The valve 50 remains closed here.

When the cab moves in such a way that the piston rod 9 is forced into the cylinder housing 6, fluid flows out of the push chamber 13 by way of the open valve 50 to the reservoir 1. In this situation the valve 50 opens because a hydraulic pressure is exerted upon a control pressure opening surface of the sliding element by way of the control pressure line 54. At the same time no hydraulic pressure is acting upon the closing surface of the sliding element, so that only the (light) spring 58 is counteracting the opening of the valve 50.

When the cab moves in such a way that the piston rod 9 is forced into the cylinder housing 6, hydraulic fluid is also sucked out of the reservoir 1 by way of the line 16. A (slight) vacuum in fact occurs in the pull chamber 12, which vacuum, possibly in conjunction with the pressure above atmospheric pressure in the reservoir 1, leads to a flow of fluid out of the reservoir, along the weak non-return valve 23 to the pull connection. In this way the pull chamber 12 remains filled with hydraulic fluid. The opening pressure of the valve 23 is preferably low, preferably less than 0.5 bar, for example approximately 0.2 bar. In order to prevent too great a flow of hydraulic fluid, the throttling device 36 is provided, which throttling device can be composed of two bores of small diameter, for example 0.5 millimeter, placed one behind the other.

In its entirety, what is now achieved is that while the vehicle is being driven, during which time the cab constantly springs up and down, hydraulic fluid is circulated through the hydraulic circuit of the tilting device. The direction of flow here is from the reservoir 1 to the pull chamber, by way of the lost-motion conduit 40, to the push chamber 13, and from the push chamber 13, by way of the valve 50, back to the reservoir 1.

The first advantage of the circulation of hydraulic fluid is that fluid is supplied constantly to the pull chamber 12, so that even if air were to leak along the piston rod seal 11 into the pull chamber 12, it would be a minimum quantity here. The pressure in the pull chamber 12 can thus constantly adjust to the value set by the valve 43.

The pressure in the pull chamber 12 is now determined by the opening pressure of the valve 43 in the lost-motion conduit 40 and the pressure in the push chamber 13. In practice, a maximum pressure of, for example, 2.5 bar above atmospheric pressure could be achieved in the pull chamber 12 in the lost-motion mode. If that pressure prevails in the pull chamber 12, in the embodiment illustrated a pressure of approximately 1 bar below atmospheric pressure prevails in the push chamber. The maximum pressure in the push chamber 13 is then between 0.5 and 2 bar above atmospheric pressure, which last value prevails at a minimum pressure in the pull chamber 12.

FIG. 2 shows a tilting device which corresponds largely to the tilting device according to FIG. 1. The difference is in particular that in this case a preferably electrically driven pump 60 of the reversible type is used, having two ports 61, 62, which serve as delivery port or suction port depending on the pumping direction. Components of the tilting device in FIG. 2 which correspond to components shown in FIG. 1 are provided with the same reference numerals. A suction exchange valve 64 and two pressure-relief valves 65, 66 can also be seen in FIG. 2. In the light of the description with reference to FIG. 1, it will be clear to the person skilled in the art that here again a circulation of hydraulic fluid occurs during the lost-motion mode.

FIG. 3 shows a variant of the tilting device according to FIG. 1. Corresponding parts are provided with the same reference numerals.

In the case of the tilting device according to FIG. 3 an additional valve 67 is provided compared with the tilting device according to FIG. 1. Said valve 67 is fitted in the common part of the lost-motion conduit 40 and the second line 17, which at the common port 41, 15 connects to the push chamber 13 of the cylinder 5. The lost-motion conduit 40 is thus in communication with the second line 17.

The valve 67 is designed to connect the push chamber 13 to, or in certain conditions to shut it off from, the lost-motion conduit 40 and the second line 17.

The valve 67 is a hydraulically controlled slide valve of the two-way/two-position 2/2 type with spring reset to the closed position by means of spring 68.

The valve 67 has a sliding element which is hydraulically adjustable under the influence of hydraulic pressure by way of the control lines 69, 70, 71.

When hydraulic fluid is supplied under pressure by means of the pump 3 to the second line 17, the valve 67 opens under the influence of the hydraulic pressure by way of control line 71. If the piston 8 is within the lost-motion range, the valve 67 will open as soon as the force by way of the pressure along control line 71 is equal to the force of the spring 68. If the piston 8 is outside the lost-motion range, the valve 67 opens if the pressure at control line 71 is equal to the pressure in the push chamber 13 and the force of the spring 68.

When hydraulic fluid is supplied under pressure by means of the pump 3 to the first line 16, so long as the port 42 is still connected to the push chamber 13 the valve 67 will remain closed under the influence of the pressure by way of the control line 69 and 70. The fluid then flows through the lost-motion conduit 40 and by way of the non-return valve 30 out of the push chamber 13. If the piston 8 goes within the lost-motion range, the pressure in control line 69 falls away and the valve 67 is opened by the pressure in control line 70.

During the inward movement of the piston 8 in the lost-motion mode of the tilting device a build-up of pressure in the push chamber 13 causes the valve 67 to be opened by way of the control line 70.

During an outward movement of the piston 8 in the lost-motion mode a build-up of pressure occurs in the control lines 69 and 71. Owing to the fact that the surfaces upon which these control pressures act are different, the valve 67 remains closed. The circulation flow of fluid out of the pull chamber 12 occurs through the lost-motion conduit 40 directly by way of the valve 30 (which opens under the influence of control pressure through line 31) to the reservoir 1. This flow therefore does not pass through the push chamber 13 here.

As a result of the valve 67, the anti-suction valves 34, 35 in FIG. 1 are no longer necessary.

It will be clear to the person skilled in the art that the inventive idea described can also be achieved in the case of hydraulic tilting devices with a hydraulic diagram that differs in one or more points. For instance, it is conceivable for the valves 30 and 43 to be integral in the slide valve 50.

The inventive idea can also be implemented in the tilting device described in DE 197 30 499 with reference to FIG. 1 of that German publication. In this case it is sufficient in the case of that known tilting device to dispense with the anti-suction valves 29, 30 (assembly 132) in the line 16 to the pull chamber of the tilting cylinder and to make the reservoir an airtight reservoir with excess-pressure valve, as explained here earlier with reference to FIG. 1 of this present invention. No anti-suction valves need be present in the line 20 of the known tilting device either.

What is claimed is:

1. A hydraulic tilting device for tilting a cab of a vehicle between a driving position and a tilted position, which cab in the driving position is resiliently supported on a chassis of the vehicle, which tilting device comprises:

a reservoir for hydraulic fluid, a pump connected to the reservoir and having a delivery port for delivering hydraulic fluid under pressure;

a double-acting, hydraulic tilting cylinder, for tilting the cab, comprising a cylinder housing, containing a cylinder space, and comprising a piston/piston rod assembly including a piston and a piston rod, which piston/piston rod assembly is moveable back and forth in said cylinder space, the piston rod of which assembly projects outwards out of the cylinder housing through a corresponding piston rod seal, which piston/piston rod assembly forms a pull chamber in the cylinder space, so that the piston/piston rod assembly is retracted when hydraulic fluid is supplied to said pull chamber, and a push chamber, so that the piston/piston rod assembly is extended when hydraulic fluid is supplied to said push chamber, a corresponding pull connection and push connection being provided for the pull chamber and the push chamber, in which the tilting cylinder is further provided with a lost-motion conduit, extending between ports which open into the cylinder space of the tilting cylinder, which ports are in communication with the push chamber and the pull chamber respectively if the piston of the piston/piston rod assembly is in a lost-motion range defined by the ports, the piston/piston rod assembly being able to move within said lost-motion range if the cab is carrying out spring movements in its driving position, a valve, which is disposed in the lost-motion conduit and can shut off the lost-motion conduit, a line system, such that the pull connection and the push connection are connectable to the delivery port of the pump or the reservoir, wherein the tilting device is designed such that during movements of the piston of the piston/piston rod assembly within the lost-motion range hydraulic fluid is supplied from the reservoir to the pull chamber by way of the pull connection, and wherein hydraulic fluid is moved from the pull chamber to the reservoir by way of the lost-motion conduit, so that in general a circulation of hydraulic fluid occurs if the cab is carrying out spring movements.

2. A tilting device according to claim 1, wherein said valve is a valve which closes in the direction of the pull chamber and opens at a predetermined opening pressure in the pull chamber.

3. A tilting device according to claim 1, in which the tilting device is designed such that during movements of the piston of the piston/piston rod assembly within the lost-motion range hydraulic fluid is supplied from the reservoir to the pull chamber by way of the pull connection, and in which hydraulic fluid is moved from the pull chamber to the push chamber by way of the lost-motion conduit, and in which hydraulic fluid is discharged from the push chamber to the reservoir, so that a circulation of hydraulic fluid occurs in its entirety if the cab is carrying out spring movements.

4. A tilting device according to claim 1, in which the reservoir is airtight with a pressure-relief valve, in such a way that the maximum reservoir pressure in the reservoir is limited to a pressure above atmospheric pressure, so that the reservoir pressure contributes to the supply of hydraulic fluid to the pull chamber.

5. A tilting device according to claim 4, in which the maximum reservoir pressure is 1.5 bar above the outside air pressure.

6. A tilting device according to claim 1, in which in the line system between the reservoir and the pull connection, in particular between the delivery port of the pump and the pull connection, if suction from the reservoir is possible by way of the pump, a non-return valve closing in the direction of the reservoir is accommodated, which non-return valve opens at an opening pressure, which opening pressure is advantageously less than 0.5 bar.

7. A tilting device according to claim 1, in which in the line system between the reservoir and the pull connection a throttling device is accommodated.

8. A tilting device according to claim 1, in which in the line system between the reservoir and the pull connection a throttling device is accommodated having one or more bores disposed one after the other and having a diameter of approximately 0.5 millimeter.

9. A tilting device according to claim 1, in which a hydraulically operated slide valve is provided, which slide valve has a first valve port, which is connected to the push chamber, a second valve port, which at least in the lost-motion mode is connected to the reservoir, and a sliding element, which is slidable between a closing position, in which the first and second valve ports are shut off from each other, and an opening position, in which the first and second valve ports are in communication with each other, the slide valve being provided with a spring means which loads the sliding element in the direction of its closing position, and in which an opening control surface is associated with the sliding element, which opening control surface by way of a control line is in communication with the push chamber, so that a hydraulic pressure in the push chamber acts upon the opening control surface in order to force the sliding element to the opening position, and a closing control surface being present, which by way of a control line is connected to the cylinder space, so that a hydraulic pressure in the push chamber acts upon the closing control surface in order to force the sliding element to the closing position.

10. A vehicle, comprising a tilting cab, a chassis and pivoting means, which connect the cab to the chassis, in which the cab is tiltable through an angle relative to the chassis about a pivot pin defined by the pivoting means, between a driving position and a tilted position, and in which the cab is resiliently supported on the chassis, and a hydraulic tilting device according to claim 1 is provided, in order to tip the cab, the tilting cylinder being fitted directly between the chassis and the cab.

11. A tilting device according to claim 6, wherein said opening pressure is approximately 0.2 bar.

* * * * *